Aug. 22, 1967  J. P. BAGBY  3,337,660
PROCESS FOR MAKING REFLECTORS
Filed Sept. 23, 1963  3 Sheets-Sheet 1

John P. Bagby,
Robert C. Erdmann,
INVENTORS.

BY.

*Noel B. Hammond*

AGENT.

Aug. 22, 1967  J. P. BAGBY  3,337,660
PROCESS FOR MAKING REFLECTORS
Filed Sept. 23, 1963  3 Sheets-Sheet 3

John P. Bagby,
Robert C. Erdmann,
INVENTORS.

BY.

Noel B. Hammond

AGENT.

3,337,660
PROCESS FOR MAKING REFLECTORS
John P. Bagby, Pacific Palisades, and Robert C. Erdmann, Los Angeles, Calif., assignors to Hughes Aircraft Company, Culver City, Calif., a corporation of Delaware
Filed Sept. 23, 1963, Ser. No. 310,553
12 Claims. (Cl. 264—1)

The present invention relates to reflectors and, more particularly, to a process for making curved concave and convex reflectors.

Curved reflectors of less accuracy than required for telescopes, such as paraboloidal reflectors for use in searchlights, solar collectors, radar antennas and magnifying shaving mirrors, are usually made by molding or otherwise forming the mirror to the configuration of a reference standard or master. Some reflectors are made by electroforming nickel onto a glass master and subsequently removing the electroformed nickel layer which then is a reflector in the shape of the glass master. Concave parabolic reflectors have also been made by spinning a solidifiable liquid, thus causing it to assume a parabolic shape while hardening. Extremely large curved reflectors are usually made by fitting together a mosaic of small accurately curved sections because large masters are extremely costly.

These conventional methods of making moderately accurate curved reflectors are complex, time-consuming and expensive, especially for reflectors on the order of several feet or more in diameter. Hence, the reflectors made by these processes are expensive and, in addition, are heavy and fragile.

Accordingly, it is an object of the present invention to provide a process for making moderately accurate curved reflectors which is simple, rapid and inexpensive and suitable for making large reflectors.

Another object of the invention is the provision of a process for making curved reflectors that are sturdy and light in weight.

In accordance with these and other objects of the invention, a thin circular diaphragm or membrane having a reflecting surface is clamped around the periphery and stretched by differential pressure beyond the elastic limit to the approximate sagitta desired. The diaphragm then approximates the configuration of a portion of the surface of an oblate spheroid. The differential pressure is then reduced, causing the diaphragm to relax to configurations other than that of an oblate spheroid due to having initially exceeded the elastic limit of the diaphragm. This is accomplished without substantial change of the initial sagitta. As the differential pressure is reduced, the configuration of the diaphragm changes successively to substantially conform to a portion of the surface of a family of oblate spheroids, a sphere, a family of prolate spheriods, a paraboloid and finally, a family of hyperboloids. By stopping the reduction of differential pressure (holding the differential pressure constant), the relaxation of the diaphragm is arrested while it has any selected configuration. A solidifiable substance is then applied to the diaphragm to render the selected configuration permanent.

The following specification and the accompanying drawings describe and illustrate an exemplary method of practicing the present invention. Consideration of the specification and the drawings will provide an understanding of the invention, including the novel features and objects thereof. Like reference characters denote like parts throughout the figures of the drawings.

Figure 1:
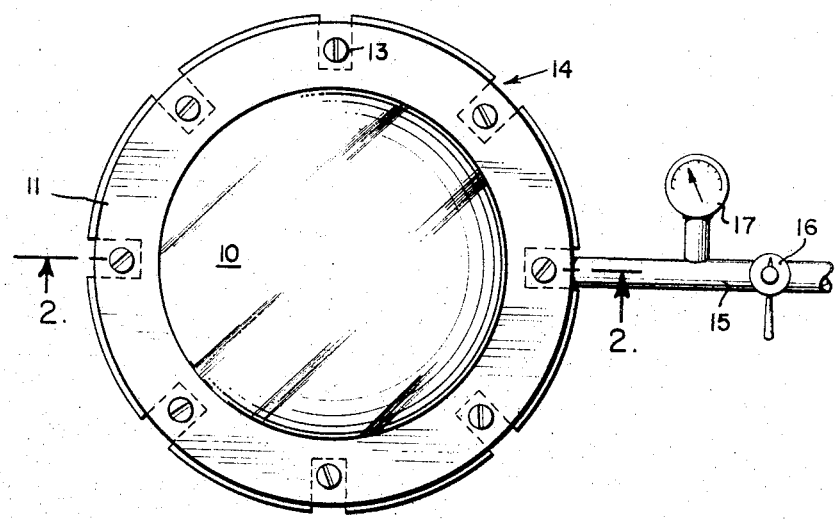
FIG. 1 is a plan view of apparatus used in the process of making a curved reflector in accordance with the present invention.

Referring now to FIG. 1 of the drawings, there is shown a thin circular membrane or diaphragm 10 which is to be formed into a curved concave or convex reflector. The diaphragm 10 is made of a flexible resilient reflecting material such as metal or plastic coated with a reflecting material. Polyester film has been found to be satisfactory and the diaphragm 10 illustrated in FIG. 1 may be a sheet of transparent polyester film 2 mils (.002 inch) thick having a vacuum deposited aluminum film on one side approximately ten molecules thick. One such material is sold under the name Mylar, a trademark of E. I. du Pont de Nemours & Co., and may be purchased with or without the aluminum coating. If desired, a metallized or reflecting surface may be formed on the diaphragm 10 after it has been shaped, by vacuum-depositing a metal film, for example.

Figure 2:
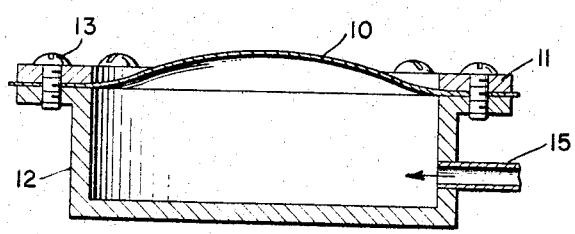
FIG. 2 is an elevation view in cross section of the apparatus of FIG. 1.

The diaphragm 10 is clamped around the periphery by a clamping ring 11 to a mating flange of a cylindrical chamber 12 (FIG. 2) by means of screws 13. The periphery of the diaphragm 10 is provided with holes or slots 14 to accommodate the screws 12. When the diaphragm 10 has been clamped to the chamber 12 by the clamping ring 11, the chamber 12 is air tight. It may sometimes be desirable to use an O-ring (not shown) between the diaphragm 10 and the flange of the chamber 12 to prevent air leakage. A pipe 15 connects the interior of the chamber 12 to a vacuum pump or air compressor (not shown). By this means, a differential pressure may be applied to the diaphragm 10. A stopcock 16 is provided to maintain the pressure or vacuum within the chamber 12 at any desired amount indicated on a gauge 17, which is also connected to the pipe 15. Should there be pinholes in the diaphragm 10 or other sources of air leakage, a pressure regulator (not shown) may be used to maintain the pressure or vacuum within the chamber 12 at any desired amount.

When differential pressure is applied to the normally flat, planar diaphragm 10, it stretches into a configuration corresponding most nearly to a portion of the surface of an oblate spheroid. An oblate spheroid is the figure formed by the rotation of an ellipse about its minor axis. As the pressure is increased, the diaphragm 10 becomes more oblate, the changes in configuration corresponding to a family of oblate spheroids. When the differential pressure is reduced, the diaphragm 10 becomes less oblate until finally it completely relaxes to again form a flat, planar surface. During relaxation, the configuration of the diaphragm 10 always nominally corresponds to a portion of the surface of an oblate spheroid, provided that the maximum differential pressure applied was not sufficient to exceed the elastic limit of the diaphragm 10.

However, if the elastic limit of the diaphragm 10 is exceeded during the increase of the differential pressure, a change takes place in the diaphragm 10. As the pressure is reduced, instead of retaining the configuration of an oblate spheroid, the diaphragm 10 passes through all the conic section figures of revolution, while the sagitta (depth of the diaphragm 10 at the center or vertex as measured between the surface of the diaphragm 10 and a straightedge laid across any diameter) remains substantially the same. As the diaphgram 10 becomes less oblate, it first passes through a family of oblate spheroids, then it forms a nominal spherical surface, following which, it passes through a family of prolate spheroids (a figure formed by the rotation of an ellipse about its major axis) then it closely approaches a paraboloid, and finally passes through a family of hyperboloids before completely relaxing to again form a nominally flat, but wrinkled, planar surface. The wrinkles are due to having exceeded the elastic limit and thereby permanently deforming the diaphragm 10.

By stopping the reduction of differential pressure (holding the differential pressure constant) at a selected amount, the relaxation of the diaphragm 10 is arrested while it has any selected configuration. If the diaphragm 10 is relaxed to a nominally flat surface and the selected pressure is then re-applied, the diaphragm 10 will again assume the selected configuration, provided the diaphragm 10 is not stretched beyond the elastic limit again. However, if the diaphragm 10 is expanded beyond the elastic limit a second time, a new change takes place in the diaphragm 10 and the selected configuration is produced by a different value of differential pressure than previously.

The initial expansion of the diaphragm 10 beyond the elastic limit and relaxation to the selected configuration may be effected either by means of a vacuum expanding the diaphragm 10 into the chamber 12, or by air pressure expanding the diaphragm 10 outwardly away from the chamber 12. The amount of differential pressure which produces the selected configuration by means of the vacuum is substantially identical to the amount of differential pressure which produces the same selected configuration by means of the air pressure.

As a specific example, a concave parabolic reflector having a diameter or aperture of 20 inches and a focal length of 12 inches (an $f$/number or ratio of focal length to aperture of $f/0.6$) is made by using a diaphragm 10 greater than 20 inches in diameter, for example 22 inches, to provide for its being clamped to the chamber 12. The diaphragm 10 is fastened to the chamber 12 with the aluminized surface down, or facing into the chamber 12. A vacuum is drawn on the chamber 12 causing the diaphragm 10 to stretch into the chamber, being concave as viewed from outside the chamber 12. The differential pressure is increased until the diaphragm 10 stretches beyond its elastic limit, approximately 2½ p.s.i. (pounds per square inch) in the present example, to a sagitta slightly in excess of the sagitta desired. In the present example, a sagitta of approximately 2 inches is desired and the pressure of 2½ p.s.i. produces a sagitta of approximately 2½ inches. The sagitta will decrease to that desired when the pressure is reduced. With experience, the change in sagitta can be allowed for almost exactly.

To determine whether the elastic limit has been exceeded, the configuration of the diaphragm 10 is measured at a reduced differential pressure, for example ½ p.s.i., to determine whether it still is that of an oblate spheroid. If so, the elastic limit has not been exceeded and the differential pressure is therefore increased beyond the previous maximum. When measurements at reduced vacuum indicate that the diaphragm 10 has the configuration of one of the other conic section figures of revolution such as a sphere, prolate spheroid, paraboloid or hyperbolid, then the elastic limit has been exceeded. If the approximate desired sagitta has been reached without exceeding the elastic limit of the diaphragm 10, then a thinner diaphragm 10 must be used, or one made of a different material having different physical characteristics.

Measurements of the configuration of the diaphragm 10 may be made by any suitable method. For example, an optical method of measuring the points of interception of the optical axis by the normal lines from selected small areas on the surface of the diaphragm 10 has been found to be satisfactory. In this measurement, a circular mask of the same diameter as the diaphragm 10 is placed in front of the concave, reflecting diaphragm 10. The mask may be made of paper and is provided with several small windows along a diameter of the diaphragm 10, each of which may be individually opened. The windows may be on the order of ½ inch square.

A light source, such as a ⅛ inch aperture illuminated by a small electric lamp, and an image card are arranged side by side on a line normal to and passing through the optical axis of the diaphragm 10, with the light source slightly to one side of the optical axis, and the image card slightly to the opposite side of the axis. The light source is directed toward the vertex of the concave diaphragm 10 and the image card is oriented in a plane normal to the axis.

A central window in the mask over the vertex of the diaphragm 10 is uncovered and the light source and image card are together moved along the optical axis until a sharp image of the light source appears on the image card. Then the distance from the location of the image card and light source to the surface of the diaphragm 10 along the optical axis is measured. The measured distance is the radius of curvature of the central area of the diaphragm 10, and in the present example is on the order of 24 inches or twice the focal length. A pencil mark is made on the image card at the location of the image.

Once the radius of curvature of the central area has been established, the central window in the mask is closed and a different window is opened. The light source and the image card are again moved together along the optical axis until the image falls on the pencil mark on the image card. This is approximately the point of interception of the optical axis (or axis-intercept) of the normal to the portion of the surface of the diaphragm 10 exposed by the open window in the mask. The distance and direction of the axis-intercept from the center of curvature (point where the radius of curvature of the central area was measured) are noted. Similar measurements are made at other locations on the diaphragm 10 by opening and closing appropriate windows in the mask.

Ten measurements may be made, five along a first diameter and five along a second diameter orthogonal to the first. From these measurements, the configuration of the diaphragm 10 may be determined. In the preliminary stages, it is usually sufficient to make only three measurements along a single radius of the reflector. For example, besides the measurement of radius of curvature at the vertex, the diaphragm 10 may be measured at a point 70% of the distance from the center to the edge, and finally, near the edge.

When the diaphragm 10 has the configuration of a perfect sphere, all of the measurements of axis-intercept coincide with the center of curvature. When the diaphragm 10 has a parabolic configuration, the difference between the axis-intercepts and the center of curvature is equal to $D^2/2R$, where D is the distance to the optical axis along a line orthogonal to the axis from the portion of the diaphragm 10 exposed by the open window, and R is the radius of curvaure of the central zone. For the specific parabola being described, the radius of curvature is approximately 24 inches; the axis-intercept for the 70% point is approximately 25 inches from the vertex, hence the axis-intercept is approximately one inch away from the center of curvature in a direction away from the vertex; and the axis-intercept for the edge of the diaphragm 10 is approximately 2 inches away from the center of curvature in a direction away from the vertex. These figures apply only to the 20-inch $f/0.6$ reflector.

Figure 3:
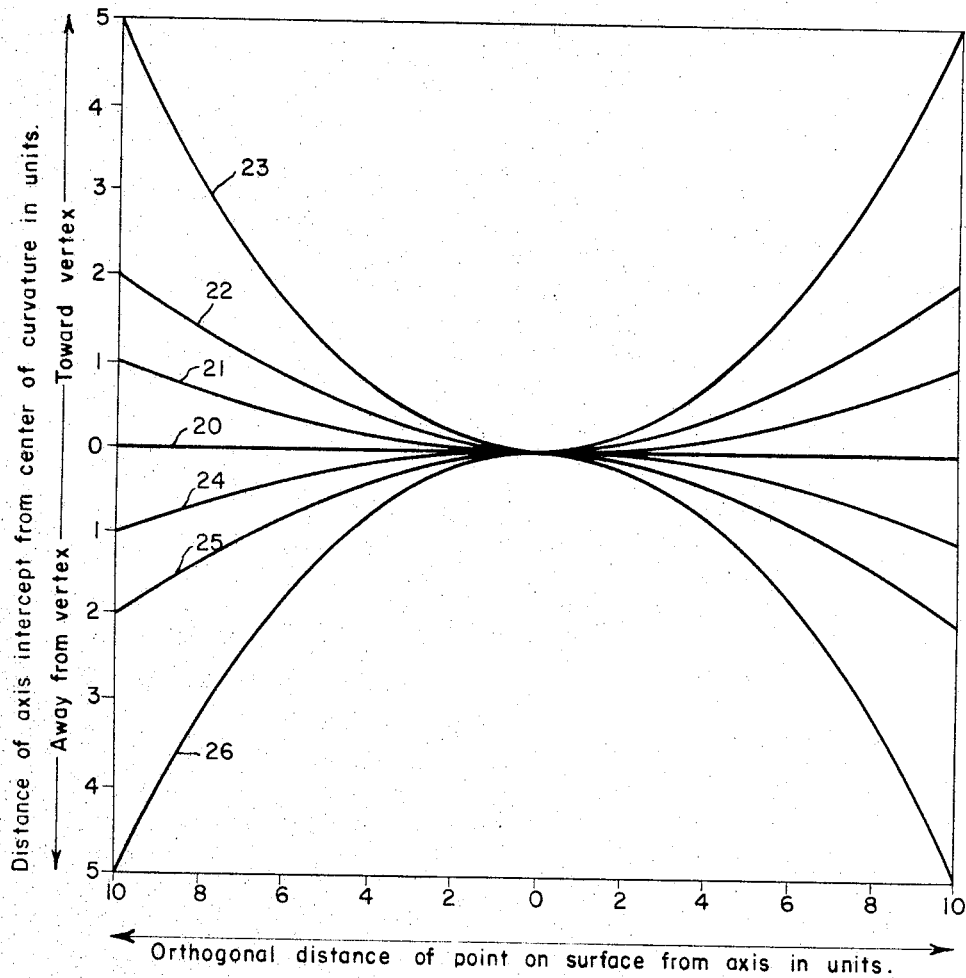
FIG. 3 is a graph with which the configuration of a diaphragm may be identified.

FIG. 3 is a graph which may be used in making $f/0.6$ reflectors. The graph shows distance of axis-intercept from center of curvature plotted as a function of orthogonal distance of a point on the surface of the diaphragm 10 from the optical axis. The straight horizontal line 20 represents the results of the measurement of a spherical surface where all the axis-intercepts coincide with the center of curvature. The curves 21, 22, 23 above the horizontal line 20 indicate the results for a family of oblate spheroids, indicating that the axis-intercepts are displaced from the center of curvature of the central area of the diaphragm 10 in a direction toward the vertex. The first curve 24 below the horizontal line 20 represents the results for one of a family of prolate spheroids indicating that the axis-intercepts are slightly displaced from the center of curvature in a direction away from the vertex. The next curve 25 indicates the results for a paraboloid in which the axis-intercepts are displaced from the center of curvature of the central zone by the amount $D^2/2R$ and in a direction away from the vertex. The last curve 26 represents the results for one of a family of hyperboloids where the axis-intercepts are still farther from the center of curvature in a direction way from the vertex. The measured length of the radius of curvature of the central zone may be different for each of the curves 20–26 but the relationship between axis-intercepts and the center of curvature for any given configuration of the diaphragm 10 is as shown in FIG. 3.

By plotting measurements of the radius of curvature of the central area of the diaphragm 10 and several axis-intercepts on the graph of FIG. 3, it can be determined to which conic section figure of revolution of the diaphragm 10 most closely conforms. Furthermore, if the diaphragm 10 does not have the desired configuration, is is possible to determine by looking at the graph of FIG. 3 whether the differential pressure should be increased or decreased and whether the change in pressure should be large or small.

To complete the specific example of the making of a 20-inch $f/0.6$ reflector, when the measurements indicate that the diaphragm 10 has the desired configuration, in the present instance a parabolic configuration, the amount of vacuum is noted. In the present example, it will be found that when the vacuum is approximately ½ p.s.i., the diaphragm 10 closely approaches a paraboloid. The diaphragm 10 may be used as a reflector while mounted on the chamber 12, if desired, by sealing the chamber 12 to maintain the differential pressure at the desired amount or by setting the pressure regulator to the correct amount. However, for such use, the diaphragm 10 normally would be placed in the chamber 12 with the aluminized coating up, or facing out of the chamber 12, to eliminate transmission loss through the transparent polyester film.

It is usually found more convenient to render the shape of the diaphragm 10 permanent at the desired configuration so that it may be removed from the chamber 12. Air is admitted into the chamber 12, causing the diaphragm 10 to return a nominally flat surface, following which, compressed air is applied to the chamber 12. The pressure is brought to the same amount which produced the parabolic configuration with the vacuum, ½ p.s.i. in the present example, using care not to exceed the amount which previouly expanded the diaphragm 10 beyond the elastic limit (2½ p.s.i. in the present example). This causes the diaphragm 10 to stretch outwardly to form a convex parabolic surface, as viewed from outside the chamber 12 (see FIG. 4).

Figure 4:
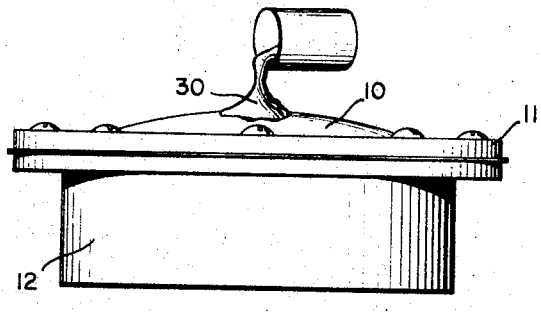
FIG. 4 is a perspective view of the performance of a step in the process of making a reflector in accordance with the present invention.
Figure 5:
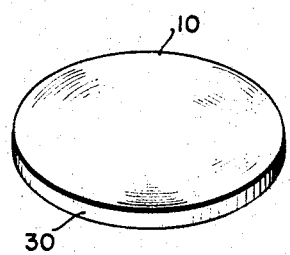
FIG. 5 is a perspective view of a reflector made by the process of the present invention.

A solidifiable substance 30 is then poured onto the convex surface of the diaphragm 10 while maintaining the differential pressure constant, as shown in FIG. 4. The solidifiable substance 30 may be an epoxy resin or a polyurethane foam such as the product CPR 302–20E sold by CPR International Corp. of Torrance, Calif., and having a density of 20 pounds per cubic foot. For a 20-inch reflector, a layer ¼ inch thick will be found to be adequate, and if the ring 11 is of that thickness it will contain the solidifiable substance 30 until it hardens. After the solidifiable substance 30 has hardened, the air pressure is removed from the chamber 12 and the diaphragm 10 is unclamped therefrom. The margin of the diaphragm 10 which was clamped beneath the clamping ring 11 is trimmed away using a knife or the like, leaving a 20-inch concave parabolic reflector, as shown in FIG. 5.

It has been found that the solidifiable substance 30 degrades the performance of the reflector somewhat. The reflecting and imaging efficiency of a deflector made by the process of the present invention is on the order of 66% prior to applying the solidifiable substance 30. Mirrors suitable for use in telescopes for astronomy have a reflecting and imaging efficiency on the order of 90%. After the solidifiable substance 30 has hardened on the back of the diaphragm 10, the reflecting and imaging efficiency decreases from about 66% to about 45%. This is due primarily to an increase in surface roughness, rather than a distortion of the over-all configuration. Parabolic reflectors as large as four feet in diameter have been made having the same optical quality as the 20-inch reflector. Spherical, hyperboloidal and ellipsoidal reflectors may also be made by the process of the present invention.

To make convex reflectors, after the elastic limit has been exceeded, and after the differential pressure which produces the desired configuration has been determined by measurement, a vacuum which produces the desired configuration is drawn on the chamber 12. The solidifiable substance 30 is then applied to the concave surface of the diaphragm 10.

Once the pressure which produces a particular configuration has been determined, it is not necessary to make further measurements to produce a second reflector substantially identical with the first. It is only necessary to first bring the differential pressure to the predetermined amount which exceeds the elastic limit of the diaphragm 10 and which provides the approximate sagitta desired, then to reduce the differential pressure to the predetermined amount which produces the desired configuration, and finally to apply the solidifiable substance 30.

Figure 6:
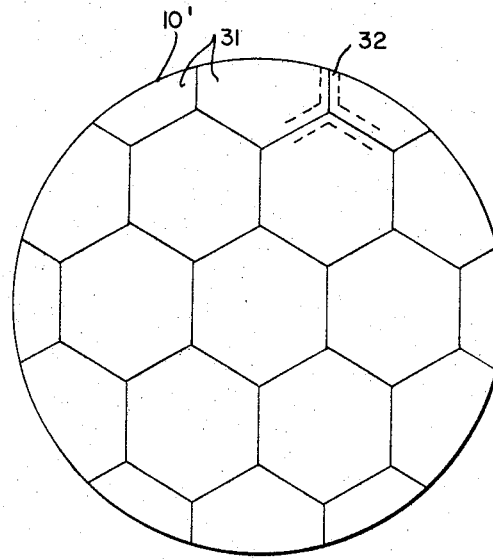
FIG. 6 is a plan view of a diaphragm suitable for use in making large reflectors by the process of the present invention.

Material such as the aluminized transparent polyester film is at present available in limited widths. Large reflectors, for example 60 feet in diameter, may be made by using a diaphragm 10' made of a mosaic pattern of hexagonal sections 31 of polyester film as shown in FIG. 6. This type of construction reduces the optical quality by approximately 10%. The hexagonal sections 31 may be fastened together by a tape 32 of polyester film (indicated by the area between the dashed lines in FIG. 6) having an adhesive which is bonded to the hexagonal sections 31 by heat. Each of the sections 31 may be, for example, four feet across, and the tape 32 may be an inch in width. For smaller sections 31, as for example one foot across, the tape 32 may be ½ inch in width. Each of the sections 31 acts as a separate diaphragm in regard to being stretched beyond the elastic limit. The tape 32 is ordinarily applied along the seams between the individual sections 31 on the reverse or non-reflecting side of the diaphragm 10', although the areas covered by the tape 32 will not contribute to the optical performance of the finished reflector and, hence, the tape 22 may be applied to the front or reflecting surface if desired.

Thus, there has been described a method of making moderately accurate curved reflectors. The method is simple, rapid, inexpensive and suitable for making large reflectors. The reflectors made by the method of the present invention are sturdy and light in weight.

Although several variations in the practice of the invention have been shown and described, other variations may be made and it is intended that the foregoing disclosure shall be considered only as illustrative of the principles of the invention and not construed in a limiting sense.

What is claimed is:

1. A method of making a curved reflector comprising the steps of:
    clamping the periphery of a thin circular diaphragm to a pressure chamber, the diaphragm being made of a flexible material having an elastic limit and having a reflecting surface;

applying a predetermined amount of differential pressure to the pressure chamber sufficient to stretch the diaphragm beyond the elastic limit of the material;

applying a predetermined lesser amount of differential pressure to the chamber sufficient to cause the diaphragm to assume a desired configuration;

and maintaining said diaphragm clamped to said pressure chamber and at said lesser amount of differential pressure while said diaphragm is employed as a reflector.

2. A method of making a curved reflector comprising the steps of:

clamping the periphery of a thin circular diaphragm to a pressure chamber, the diaphragm being made of a flexible material having an elastic limit;

applying a predetermined amount of differential pressure to the pressure chamber sufficient to stretch the diaphragm beyond the elastic limit of the material;

applying a predetermined lesser amount of differential pressure to the chamber sufficient to cause the diaphragm to assume a desired configuration;

applying a reflecting coating to the diaphragm;

and maintaining said diaphragm clamped to said pressure chamber and at said lesser amount of differential pressure while said diaphragm is employed as a reflector.

3. A method of making a parabolic reflector comprising the steps of:

fastening a circular membrane of aluminized polyester film across the open end of a pressure chamber by clamping the membrane around the periphery;

applying sufficient pressure to the membrane to cause it to stretch beyond its elastic limit;

decreasing the pressure until the membrane relaxes to form a paraboloid;

applying a solidifiable polyurethane foam material to the membrane and permitting it to harden;

and removing the rigid parabolic membrane from the pressure chamber.

4. A method of making a curved reflector comprising the steps of:

clamping the periphery of a thin circular diaphragm to a pressure chamber, the diaphragm being made of a flexible material having an elastic limit and having a reflecting surface;

applying a predetermined amount of differential pressure to the pressure chamber sufficient to stretch the diaphragm beyond the elastic limit of the material, the diaphragm closely conforming to an oblate spheroid;

applying a predetermined lesser amount of differential pressure to the chamber sufficient to cause the diaphragm to assume a desired configuration;

coating the surface of the diaphragm opposite the reflecting surface with a solidifiable substance and permitting it to harden to cause the curved diaphragm to become rigid;

and unclamping the rigid curved diaphragm from the chamber.

5. A method of making a curved reflector comprising the steps of:

clamping the periphery of a thin circular diaphragm to a pressure chamber, the diaphragm being made of a flexible material having an elastic limit and having a reflecting surface;

applying differential pressure to the pressure chamber, the amount of differential pressure being sufficient to stretch the diaphragm beyond the elastic limit of the material, the diaphragm closely conforming to an oblate spheroid;

decreasing the differential pressure in steps permitting the diaphragm to relax from an oblate spheroid, to substantially a spherical surface, a prolate spheroid, a paraboloid and finally to a hyperboloid while measuring the configuration produced at different amounts of differential pressure to determine the amount of differential pressure which produces the desired configuration;

applying the amount of differential pressure to the chamber which was predetermined to cause the diaphragm to assume the desired configuration;

coating the surface of the diaphragm opposite the reflecting surface with a solidifiable substance and permitting it to harden to cause the curved diaphragm to become rigid;

and unclamping the rigid curved diaphragm from the chamber.

6. A method of making a concave reflector comprising the steps of:

clamping the periphery of a thin circular diaphragm to a pressure chamber, the diaphragm being made of a flexible material having an elastic limit and having a reflecting surface;

applying differential pressure to the pressure chamber, the amount of differential pressure being sufficient to stretch the diaphragm beyond the elastic limit of the material, the diaphragm approximating an oblate spheroid;

decreasing the differential pressure in steps permitting the diaphragm to relax from an oblate spheroid, to a substantially spherical surface, a prolate spheroid, a paraboloid and finally to a hyperboloid while measuring the configuration produced at different amounts of differential pressure to determine the amount of differential pressure which produces the desired configuration;

applying pressure to the chamber to cause the diaphragm to stretch convex outwardly of the chamber, the amount of pressure being that which was predetermined to cause the diaphragm to assume the desired configuration;

coating the convex surface of the diaphragm with a solidifiable substance and permitting it to harden to cause the curved diaphragm to become rigid;

and unclamping the rigid curved diaphragm from the chamber.

7. A method of making a concave reflector comprising the steps of:

clamping the periphery of a thin circular diaphragm to a pressure chamber, the diaphragm being made of a flexible material having an elastic limit and having a reflecting surface;

drawing a vacuum on the pressure chamber, the amount of vacuum being sufficient to stretch the diaphragm beyond the elastic limit of the material, the diaphragm approximating an oblate spheroid concave into the pressure chamber;

decreasing the vacuum in steps permitting the diaphragm to relax from an oblate spheroid, to a substantially spherical surface, a prolate spheroid, a paraboloid and finally to a hyperboloid while measuring the configuration produced at different amounts of vacuum to determine the amount of differential pressure which produces the desired configuration;

applying pressure to the chamber to cause the diaphragm to stretch convex outwardly of the chamber, the amount of pressure being that which was predetermined to cause the diaphragm to assume the desired configuration;

coating the convex surface of the diaphragm with a solidifiable substance and permitting it to harden to cause the curved diaphragm to become rigid;

and unclamping the rigid curved diaphragm from the chamber.

8. A method of making a concave reflector comprising the steps of:

clamping the periphery of a thin circular diaphragm to a pressure chamber, the diaphragm being made of a flexible material having an elastic limit and having an aluminized coating;

drawing a vacuum on the pressure chamber, the amount of vacuum being sufficient to stretch the diaphragm beyond the elastic limit of the material, the diaphragm forming a nominal oblate spheroid concave into the pressure chamber;

decreasing the vacuum in steps permitting the diaphragm to relax from an oblate spheroid, to a substantially spherical surface, the prolate spheroid, a paraboloid and finally to a hyperboloid while measing the configuration produced at different amounts of vacuum to determine the amount of differential pressure which produces a paraboloidal configuration;

applying pressure to the chamber to cause the diaphragm to stretch convex outwardly of the chamber, the amount of pressure being that which was predetermined to cause the diaphragm to assume a paraboloidal configuration;

coating the convex surface of the diaphragm with a solidifiable substance and permitting it to harden to cause the paraboloidal diaphragm to become rigid;

and unclamping the rigid paraboloidal diaphragm from the chamber.

9. A method of making a concave parabolic reflector comprising the steps of:

clamping the periphery of a thin circular diaphragm to a pressure chamber, the diaphragm being made of a flexible transparent polyester material having an aluminized coating on one side, the diaphragm being clamped with the aluminized side facing into the pressure chamber;

drawing a vacuum on the pressure chamber, the amount of vacuum being sufficient to stretch the diaphragm beyond the elastic limit of the polyester material, the diaphragm forming a nominal oblate spheroid concave into the pressure chamber;

decreasing the vacuum in steps permitting the diaprogram to relax from an oblate spheroid, to a substantially spherical surface, a prolate spheroid, a paraboloid and finally to a hyperboloid while measuring the configuration produced at different amounts of vacuum to determine the amount of differential pressure which produces a paraboloidal configuration;

applying pressure to the chamber to cause the diaphragm to stretch convex outwardly of the chamber, the amount of pressure being that which was predetermined to cause the diaphragm to assume a paraboloidal configuration;

coating the convex surface of the diaphragm with a solidifiable polyurethane foam substance and permitting it to harden to cause the paraboloidal diaphragm to become rigid;

and unclamping the rigid paraboloidal diaphragm from the chamber.

10. A method of making a concave parabolic reflector comprising the steps of:

clamping the periphery of a circular diaphragm to a pressure chamber, the diaphragm being made of a flexible transparent polyester material substantially 20 inches in diameter and substantially 2 mils thick and having an aluminized coating on one side substantially 10 molecules thick, the diaphragm being clamped with the aluminized side facing into the pressure chamber;

drawing a vacuum on the pressure chamber, the amount of vacuum being sufficient to stretch the diaphragm beyond the elastic limit of the polyester material, the diaphragm forming a nominal oblate spheroid concave into the pressure chamber, the amount of vacuum being substantially 2½ pounds per square inch;

decreasing the vacuum in steps permitting the diaphragm to relax from an oblate spheroid, to substantially a spherical surface, a prolate spheroid, a paraboloid and finally to a hyperboloid while measuring the configuration produced at different amounts of vacuum to determine the amount of differential pressure which produces a paraboloidal configuration;

applying pressure to the chamber to cause the diaphragm to stretch convex outwardly of the chamber, the amount of pressure being that which was predetermined to cause the diaphragm to assume a paraboloidal configuration, the pressure being substantially ½ pound per square inch;

coating the convex surface of the diaphragm with a solidifiable polyurethane foam substance and permitting it to harden to cause the paraboloidal diaphragm to become rigid;

and unclamping the rigid paraboloidal diaphragm from the chamber.

11. A method of making a curved reflector comprising the steps of:

clamping the periphery of a thin circular diaphragm to a pressure chamber, the diaphragm being made of a sheet comprising a plurality of hexagonal sections of a flexible material arranged in a mosaic pattern and having an elastic limit and a reflecting suface;

applying a predetermined amount of differential pressure to the pressure chamber sufficient to stretch the diaphragm beyond the elastic limit of the material, the diaphragm forming a nominal oblate spheriod;

applying a predetermined lesser amount of differential pressure to the chamber sufficient to cause the diaphragm to assume a desired configuration;

and maintaining said diaphragm clamped to said pressure chamber and at said lesser amount of differential pressure while said diaphragm is employed as a reflector.

12. A method of making a concave parabolic reflector comprising the steps of:

clamping the periphery of a thin circular diaphragm to a pressure chamber, a diaphragm being made of a sheet comprising a plurality of hexagonal sections of a flexible polyester material arranged in a mosaic pattern and having an aluminized coating on one side, the diaphragm being clamped with the aluminized side facing into the pressure chamber;

drawing a vacuum on the pressure chamber, the amount of vacuum being sufficient to stretch the diaphragm beyond the elastic limit of the polyester material, the diaphragm forming a nominal oblate spheroid concave into the pressure chamber;

decreasing the vacuum in steps permitting the diaphragm to relax from an oblate spheroid, to a substantially sperical surface, a prolate spheroid, a paraboloid and finally to a hyperboloid while measuring the configuration produced at different amounts of vacuum to determine the amount of differential pressure which produces a paraboloidal configuration;

applying pressure to the chamber to cause the diaphragm to stretch convex outwardly of the chamber, the amount of pressure being that which was predetermined to cause the diaphragm to assume a paraboloidal configuration;

coating the convex surface of the diaphragm with a solidifiable polyurethane foam substance and permitting it to harden to cause the paraboloidal diaphragm to become rigid;

and unclamping the rigid paraboloidal diaphragm from the chamber.

References Cited

UNITED STATES PATENTS 3,184,210   5/1965   Fassnach et al. ____ 264—54 X
3,251,908   5/1966   Wilenius et al. _____ 265—1

ROBERT F. WHITE, *Primary Examiner.*

A. R. NOE, *Assistant Examiner.*